United States Patent [19]

Rubenstein et al.

[11] Patent Number: 4,603,051

[45] Date of Patent: Jul. 29, 1986

[54] EDIBLE FOOD CONTAINERS AND THE METHOD OF COATING SAID CONTAINERS

[75] Inventors: Irving H. Rubenstein, Owings Mills; Claire A. Pelaez, Cockeysville, both of Md.

[73] Assignee: Maryland Cup Corporation, Owings Mills, Md.

[21] Appl. No.: 336,927

[22] Filed: Jan. 4, 1982

[51] Int. Cl.⁴ .............................................. A21D 15/08
[52] U.S. Cl. ..................................... 426/138; 426/139; 426/306; 426/307
[58] Field of Search ............... 426/101, 138, 139, 306, 426/307, 94

[56] References Cited

U.S. PATENT DOCUMENTS

| | | | |
|---|---|---|---|
| 1,559,412 | 10/1925 | Franzen | 426/306 |
| 1,615,680 | 1/1927 | Buhse | 426/139 |
| 2,925,347 | 2/1960 | Cummings et al. | 426/307 |
| 3,171,367 | 3/1965 | Carter et al. | 426/307 |
| 3,366,486 | 1/1968 | Weinstein | 426/138 |
| 3,524,759 | 8/1970 | McConnell et al. | 426/307 |
| 3,526,515 | 9/1970 | Werbin | 426/307 |
| 3,632,356 | 1/1972 | Silverstein | 426/306 |
| 3,798,338 | 3/1974 | Galle | 426/307 |
| 4,032,667 | 6/1977 | Krueter | 426/307 |

FOREIGN PATENT DOCUMENTS 947672  1/1964  United Kingdom ............... 426/306

*Primary Examiner*—Jeanette Hunter
*Attorney, Agent, or Firm*—McDougall, Hersh & Scott

[57] ABSTRACT

An edible food container provided with a moisture resistant barrier coating composition having a substantially uniform thickness on at least the internal surface thereof and which is substantially free of blocking and cracking, said coating composition being selected from the group consisting of a food grade modified fat (emulsifier), a food grade modified fat (emulsifier) containing a filler material and a fat containing a filler material.

16 Claims, 3 Drawing Figures

EDIBLE FOOD CONTAINERS AND THE METHOD OF COATING SAID CONTAINERS

BACKGROUND AND SUMMARY OF THE INVENTION

The present invention relates to edible food containers containing a moisture-proof, food grade, barrier coating and to a method of applying said barrier coating to at least one surface of an edible food container. More particularly, the present invention is directed to the application of modified food grade fats to edible food containers.

Edible food containers are containers which are used to handle and dispense a number of different kinds of food items, for example dessert type food products such as ice cream, custards, etc., and the non-dessert type food products such as Chinese food, Mexican food, and the like. Such containers are desirable because they can be consumed simultaneously with or after the consumption of the food product itself.

It is a common practice to utilize edible food containers such as ice cream cones to dispense frozen or semi-frozen ice cream products. Such cones can be manufactured by two basic methods.

One of the methods is concerned with the manufacture of molded cones which involves depositing a semi-fluid batter consisting of such ingredients as water, flour, sugar, shortening, leavening, lecithin and flavor into a mold. After the batter is disposed in the mold, a core is inserted into the mold so that the batter is forced to assume the shape of the space provided between the core and the mold. As a result, it is possible to mold cones of a conical shape or cups of various sizes and configurations. Once the core of the mold is joined with the batter, the molds are subjected to heat for an appropriate length of time, at which point the cores are removed, the molds are broken open and the cones are discharged onto a conveyor for possible trimming and for packing.

The second method for the manufacture of ice cream cones is based on the principle of baking a flat waffle between two plates to make the so-called sugar roll cone. The resulting product which is a flat sheet with an inscribed surface on the top thereof, is picked up mechanically and transferred to a piece of equipment that rolls the flat waffle into the conical shape we recognize as an ice cream cone. The phenomenon that permits this rolling process is the transformation, during the baking process, of crystalline sugar into its fluid state, since during the baking operation, the waffle reaches a temperature in excess of 300° F. To bake such a cone requires a concentration of sugar of from 20-50% or even higher, based on the weight of the flour, to provide the plasticity for the hot waffle to be rolled to the necessary shape. However, there is a problem with the pliability of the waffle, for if the waffle is too soft it is very difficult to pick up mechanically and roll. Also, once the cone has been rolled, it must not lose its shape and become "out of round" when it is dropped onto a conveyor while it is still hot and the sugar has not yet had a sufficient time to crystallize. Making a good cone is both the function of the temperature of the cone as it is discharged from the rolling mechanism and the amount of sugar in the formula. Some ovens permit, and even need, higher sugar levels than others so that the physical limitations of the oven often dictate the formula that can be used. The above mentioned factors are characteristic of industry practices.

When it is desired to add flavor and moisture resistance to cones, the cones are often put through chocolate enrobers wherein either pure chocolate coating containing cocoa butter or a compound coating which is a mixture of cocoa and vegetable fats is applied to the cone to enclose the cone in a flavored fat-base material. The problem with this technique is that great care must be exercised in the handling and shipping of cones during warm weather, for obviously the coating will melt during extreme shipping temperatures which can reach as high as 140° F. in a railroad boxcar. If a fat or a higher melting point material is used to compensate for this problem, it has been found that the eating qualities of the finished cone are adversely affected inasmuch as the high melting point fats have an unpleasant, waxy feel to the mouth.

Since many of the cones manufactured by the methods discussed above have a bland taste, as a result of a low sugar content, they are equally adaptable or can be readily adaptable for use with unsweetened, non-dessert type food products such as Chinese food, Mexican food and other related food products. However, irrespective of the type of food product which is used in conjunction with the edible food container, it is important that such containers not only possess good strength but also contain a resistance to moisture penetration by liquids which are present in both frozen and nonfrozen food products. Thus, for example, after ice cream cones, either molded or rolled are baked, there are intrinsic problems in handling, shipping and finally serving the cones. Ice cream cones are, by their very nature, fragile containers, so that great care must be taken to pack these products in materials which will protect them against breakage as they travel from the bakery to the warehouses and ultimately to the user. When the cones arrive at their destination they must be strong enough to accept the pressure of a dipped ball of frozen food product, for example, ice cream, when it is placed on the top of the cone. An operator dispensing ice cream must, of necessity, be sure that the ice cream sufficiently adheres to the cone. Thus, a degree of pressure is necessary to force the ball of ice cream onto the rim of the cone. Either because of a lack of skill of the operator or the inherent weakness of the cone there is the constant problem of the cone breaking in the process. As a result, it has long been an objective of the ice cream cone manufacturers to find a method of increasing the strength of the cone.

Sugar roll cones and to some extent molded cones are frequently used for prepacking ice cream rather than for handling ice cream at the point of service. When ice cream cones are prepacked and the combined ice cream and cone are stored in a freezer, the cone tends to absorb moisture from the ice cream. In addition, any snow or condensation that has deposited on the outside of the cone during storage melts upon exposure to ambient temperatures which further contributes to a soggy cone. Ice cream, as it is extruded from a freezer in the form of soft ice cream at a temperature of from 19° to 26° F. contains only about 30% of its water in the form of ice, while the remaining portion of the water is simply trapped in the matrix of the ice cream. The freezing of most of the remaining water in a storage area can take anywhere from one hour to forty-eight hours, depending on whether the ice cream factory has a fast freeze tunnel or relies on normal freezer temperatures of anywhere from −40° to −10° F. to accomplish this purpose. Because of this time lag in freezing the ice cream, the free water is often absorbed by the cone causing a soggy mass since there is no liquid or water barrier which exists between the cone and the ice cream. Mechanisms have been developed to spray cones with chocolate coating just prior to the dispensing of the ice cream into the cone from a filling machine. Unfortunately, spraying has been found to deposit a multiple series of droplets on the inside surface of the cone so there is the possibility of uncoating the surfaces between the particles of chocolate coating. These uncoated surface areas provided a "pathway" for moisture to penetrate the cone and eventually render soggy the baked portion disposed behind the coating.

Similar problems are experienced when non-dessert type food products such as Chinese food, Mexican food and the like are placed in cone-type edible food containers. The liquid portion of the food product is readily absorbed by the container causing the container to become soggy and difficult to handle. Thus, it is necessary to provide edible food containers with sufficient strength to resist breaking during manufacture, shipment, handling and use and also to provide containers with a resistance to moisture penetration by the food product which is introduced into the food container.

A number of the problems identical with those enumerated hereinabove have been solved by applying a moisture proofing, food grade fat material to at least one surface of an edible food container. However, in spite of the success achieved with food grade fats, certain problems have been encountered with its usage, such as for example blocking and cracking. Blocking is the result of the melting of the fat coating when exposed to extreme high temperature environmental or shipping conditions. In such a situation the fat tends to melt at the high temperatures and then reharden as the temperature cools down, thereby causing the stacked containers to stick together. Cracking is also produced by exposure to extreme environmental conditions, anything which causes a change in the crystal structure of the fat coating, absorrtion of moisture by the edible food container, and the like. In the latter case, as the container absorbs moisture from the food product disposed therein, it changes its size slightly. However, since the fat coating disposed on the container does not change much in size, cracking of the fat coating is the result.

Accordingly, an object of the present invention is to provide a method for coating edible food containers to provide them with increased moisture resistance.

Another object of the present invention is to provide edible food containers which possess improved resistance to liquid absorption, and as such are effective in holding and dispensing a variety of both hot and cold food products.

A further object of the present invention is to provide a method for coating an edible food container so that the container possesses increased strength and, as such, substantially reduces damage caused to the containers during manufacture, storage, packing and use.

Still another object of the present invention is to provide edible food containers which can be used to hold and dispense a variety of food products, such as for example, ice cream, jello, pudding, desserts, Chinese food and the like.

A still further object of the present invention is to provide edible food containers which possess a flavor which is compatible with the contents to be dispensed therein.

Yet another object of the present invention is to provide a method for producing edible food containers which contain a barrier coating of substantially uniform thickness disposed on at least one of the surfaces thereof to achieve increased strength, and/or increased moisture resistance, and/or improved flavor.

An additional object of the present invention is to provide an improved method for applying a liquid barrier coating to at least one surface of an edible food container.

Yet another object of the present invention is to provide a barrier coating for edible food containers which eliminates the problems of blocking and cracking of the coating as referred to hereinabove.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the aboveidentified disadvantages have been eliminated and the objects of the present invention have been achieved by utilizing a flo coat method and apparatus for applying a uniform coating of an edible, moisture proofing modified fat material to at least one surface of an edible food container.

As noted hereinabove it was thought that fats could not be used as a barrier coating for edible food containers because the eating quality of the coated container would be adversely effected because of the unpleasant, waxy feel of the fat to the mouth. For example, when spraying containers with a fat material, a plurality of droplets contact the surface of the container, leaving a plurality of spaces disposed between the droplets. Thus in order to cover these spaces it is necessary to again spray the container causing the fat to cover the open spaces. However, this also produces multiple layers of fat on the previously deposited fat droplets. These globs of multiple layers of fat droplets produce an unequal layer of fat material which contributes to the waxy feel which is produced in the mouth. However, these problems are effectively eliminated by utilizing the flo coat method in applying a fat coating to an edible food container. Thus by utilizing a flo coat method in combination with a modified fat material, a coating of great uniformity can be produced on the edible food container which cannot be achieved by other coating methods. By avoiding the formation of multiple layers of fat material on the surface of the edible food container, the unpleasant taste of excess fat produced by the deposition of multiple layers of fat can be eliminated. By flo coating is meant any method wherein the fat coating is introduced into the container and caused to rotate or swirl, for example, by rotating the container at high speed, whereby the container surface is uniformly coated with a single layer of a modified fat. Examples of this procedure are the flo-coating method of FIGS. 1 to 3 herein and the Flex-E-Fill method.

Enrobers are devices which are known to be effective in coating flat surfaces. However the problems involved in coating edible food containers with corners, rims and crevices where fat could accumulate are completely different from those of flat surfaces. By utilizing the flo coating techniques, a uniform coating can be applied to edible food containers without such an accumulation.

When considering edible food containers for dessert-type food products such as ice cream, jello, pudding, and the like, a barrier coating in the form of a uniform, continuous film is applied to the food container, such as for example, a molded cone or a rolled sugar cone. Advantageously, the barrier coating is applied to the inside surface of the edible food container so as to protect the container from undue moisture contributed by the food product which would otherwise be absorbed by the food container. It can be understood that where additional strength is desired, the outside surface of the food container can also be provided with a barrier coating.

The type of flavors which can be utilized in the barrier coating composition of the present invention depend on the particular food product which is being dispensed by the container. With dessert-type foods the flavors can include the citric acid flavors such as orange, lemon, grapefruit, grape, and the like and non-acid flavors such as, for example, banana, maple, and the like. For non-dessert-type food products, a variety of other flavors can be added to the fat material, such as, for example, rye flavor, garlic flavor, onion flavor, etc., depending on the particular food being dispensed.

According to the present invention the barrier coating, for example, a modified fat or a mixture of a modified fat plus a flavor-producing material is applied to an edible food container, for example, a cone, by using the flo-coating technique wherein an appropriate amount of the barrier coating is first deposited in the bottom of the container. The container is then placed in a mechanism which is rotated at a high speed forcing the liquid coating against the inside of the container. Any excess liquid which escapes from the top of the container runs back into a reservoir for reuse. Advantageously, the flo-coating material is heated up to about 220° F., preferably about 160°–220° F., depending upon the particular modified fat being utilized. After the flo-coating operation is completed, the coated food containers are discharged into either ambient conditions or into a cooling chamber depending on the particular modified fat being utilized, the packaging conditions and ambient conditions. Thus, for example, subsequent cooling may be desirable when processing under extreme summer time temperature conditions.

According to the present invention the problems of blocking and cracking of the coating can be substantially eliminated by utilizing as the coating material either a modified fat per se, a modified fat containing an inert filler material or a fat containing an inert filler material.

A modified food grade fat is a fat which has been chemically modified to form an emulsifier having desired hydrophilic and lypophilic qualities. The emulsifier has an HLB (hydrophilic/lypophilic balance) of between 1 and 15, desirably from about 2 to 7. The extreme lower limit of 1 represents an emulsifier which is highly lypophilic whereas the upper limit of 15 represents an emulsifier which is highly hydrophilic. Some hydrophilic property is advantegous since the emulsifier better attaches to the container. Within this HLB range the emulsifier has a melting point which is sufficiently high so that it will not melt under high temperature environmental conditions of, for example 120°–130° F. Also within the desired HLB range, the emulsifier forms an effective and continuous barrier coating or film on the container. A typical emulsifier is Durem 117 which is a mixture of mono- and diglycerides and a trademark of Durkee Foods.

Although the use of a modified fat material, i.e., an emulsifier, as the coating material has proved to be effective, still some cracking was experienced, particularly under extreme conditions of rapid temperature changes, high temperature conditions and radical changes of relative humidity which tend to cause swelling of the container. It is theorized that the cracking of the coating is caused by the stresses imposed on the continuous interfacing of the crystal structure of the modified fat material. Such stresses are the result of environmental conditions which can cause the container to change in its dimensions.

Thus, according to one of the further embodiments of the present invention it has been found that if an inert filler material is uniformly mixed with a fat coating or a modified fat coating (emulsifier), the resulting coating is made less rigid and the stresses normally produced in the coating are substantially reduced, whereby the coating is able to better compensate for stress caused by expansion and contraction of the container dimensions and other extreme environmental conditions without cracking.

The inert filler materials which can be added to either fats or emulsifiers must not be chemically reactive therewith, not too hygroscopic (absorb water), and readily mechanically dispersible and compatible with the fats and/or emulsifiers. Typical filler materials include starches, chemically modified starches, dextrins, food grade talc, titanium dioxide, silica, calcium phosphates, and the like. The particulate, dry filler materials are chemically inert, dispersible in the fat or emulsifier material, i.e., do not readily settle out when the mixture is agitated, and possess a particle size such that they do not adversely affect the smooth aesthetic appearance of the coating on the container.

The starches and chemically modified starches which can be added as a filler material include the amylose starches which are straight chain carbohydrates, amylopectin starches which are branch chain carbohydrates and blends of these starches, depending upon the basic source of the carbohydrate from which these starches are derived. Suitable starches include cornstarch and waxy cornstarch.

The chemically modified or processed starches are the acid and enzyme modified starches wherein a part of the starch is modified to dextrins, dextrose and other sugars. The chemically processed starches are normally identified or referred to as having a certain percentage of dextrose equivalent (DE). Suitable modified starches include modified cornstarch or other food starches.

The preferred filler materials which can be used with the barrier coating for edible food containers according to the present invention are dextrins, maltodextrins and corn syrup solids. Most dextrins, which can be made from basic carbohydrates, can be utilized in the present invention. Suitable dextrins include tapioca dextrin, e.g., N-Zorbit, which is a specially processed tapioca dextrin, corn dextrin, potato dextrin, wheat dextrin and the like. If it is desirable to add sweetness to the coating, higher DE maltodextrins can be used.

The amount of filler material which is added to the coating must be an amount sufficient, on the one hand, to prevent cracking of the coating but on the other hand must not be so much as to adversely effect the moisture barrier properties of the fat or emulsifier. The amount of the filler material also varies depending upon the particular type of filler utilized. Generally speaking an amount of filler material up to about 25% by weight can be utilized with a preferred range being about 1 to 10% by weight. An amount of about 0.5 to 3% by weight has been found to be particularly effective.

The fats or blends of fats to which the filler can be added to form the coating composition of the present invention include any food grade fats, either natural or hydrogenated, which are solid at room temperature and provide an effective barrier to moisture penetration and wetting, such as for example, fats having a melting point range of up to about 160° F. Typically, these fats are solid glyceryl esters of higher fatty acids ranging from $C_8$ to $C_{20}$, preferably $C_{12}$ to $C_{18}$. Examples of such acids are caprylic acid, lauric acid, palmitic acid, stearic acid, eicosadienoic acid and the like. Suitable food grade fats can be made from rape seed oil, hydrogenated vegetable oil, such as for example cotton seed oil, and the like. The fats of the present invention can also be modified by distillation alone, distillation and acetylation or any other method to produce modified fats which are effective for the purposes of the present invention. Furthermore, fat-containing coating such as chocolate can also be used as the fat coating of the present invention.

Examples of suitable fats include Duratex, which is a food grade powdered lubricant made from hydrogenated cotton seed oil having a capillary melting point of 136° to 144° F.; Myvacet (5-07) which is a fat which has been modified by acetylation to form an acetylated monoglyceride having a melting point of 106° to 115° F.; Myvacet (7-07K) which is also a modified fat having a melting point of 99° to 104° F.; Aratex which is a hydrogenated vegetable fat having a melting point of 115° to 119° F., various emulsifiers such as Span 60 and Tween 60, and the like. The fats can be either hydrophobic or hydrophilic in nature. In the latter case the moisture is picked up by the fat coating but not transmitted to the edible food containers.

The coating composition of the present invention was tested for blocking, cracking and leak time utilizing the following test procedures.

Blocking refers to the sticking together of the coated container or shells when nested together in stacks. This is an important consideration mainly at higher temperatures. Since the products are transported by truck or railcar, they are sometimes exposed to extremely high or low temperatures. The specifications of the coated containers of the present invention are designed to satisfy temperatures up to 120° F. and a relative humidity about 26% and even higher. Thus the laboratory blocking tests are conducted under these conditions. To perform the blocking test, a stack of 10 freshly coated shells are weighed and then placed in a high density poly bag which is closed with a twist tie. This stack is then placed, along with others, into a rectangular container which is then placed in an environmental chamber. The samples are then examined periodically i.e., every 1-7 days, as follows:

The environmental chamber is opened, an airtight lid is immediately placed on the rectangular container, and the entire container is removed from the chamber. The container which contains the samples is left to cool to room temperature (about 70°-75° F.) for about 2 hours. This slow cooling process is designed to simulate real life cooling cycles.

To test for blocking, the bag is opened, the stack of shells is very carefully removed, and the extent of blocking is determined by separating the shells from each other, one by one. Blocking is classified as trace, slight, moderate, and severe. When trace or slight blocking occurs, the shells can be separated easily and, in almost all cases, no coating disruption occurs. Hence, trace or slight blocking is considered to be acceptable. After the examination, the percentage of each degree is recorded.

These shells or containers are also examined for cracking of the coating by using a microscope. Cracking is rated as trace, slight, or moderate. Explanations of the ratings are as follows:

(a) trace: this refers mainly to the appearance of single, small coating cracks.

(b) slight: this refers to the appearance of several small or slightly longer cracks in the coating.

(c) moderate: this refers to the appearance of many medium-sized or several very long cracks in the coating.

Moderate cracking usually affects the leak time drastically, while trace and slight cracking may or may not affect the leak times significantly.

After examination, the stack of shells is returned to the bag, twist-tied, put in the container, returned to the environmental chamber, and the cycle is repeated.

To measure room temperature cracking, another stack of 10 freshly coated shells is placed in a low density poly bag, closed with a twist tie, and then placed on a shelf in the laboratory where the ambient conditions are 70°-75° F. and 30-50% relative humidity. The samples are checked for cracking every 1-7 days, according to the same procedure described for cracking evaluation discussed above.

The integrity of the coating layer is further evaluated by performing a water leak test. For conducting this test a coated shell is filled with water at 65°-70° F. The water is colored blue with methylene blue dye and is filled to a level of about ¼" from the top of the shell. The amount of time it takes for a drop of water to drip into a beaker via a passage through the coating layer and shell is referred to as the water leak time. This water leak time has been correlated with the time it takes for a coated shell to become soggy enough to collapse when bitten into after holding pudding, at room temperature. Generally speaking, every 14-15 minutes of water leak time translates to about one hour of holdout time of pudding-containing shells. The goal is thus to obtain a 6 hour holdout time with pudding-containing shells, which translates to about 1½ hours leak time.

The above test procedures were utilized in testing the blocking, cracking and leak time characteristics of the barrier coating composition of the present invention with the results being tabulated in the following Table. The Table compares modified fats which do not contain an inert filler material with those which do contain a filler material in an amount varying from 2.5 to 10% by weight, based on the total weight of the coating composition. The Table of data clearly shows that coating composition of the present invention, which contains a filler material, substantially eliminates the problems of cracking at 120° F. and 25% relative humidity.

TABLE

| Coating Composition | % By Weight | BLOCKING at 120° F., 25% RH | CRACKING at 120° F., 25% RH | LEAK TIME (HRS) |
|---|---|---|---|---|
| Durem 117[2]/ N-Zorbit | 100/0 | 22 days: OK | 22 days: 100% moderate cracking[1] | 2 |
| | | 10 days: OK | 10 days: 100% trace cracking[1] | 2 |
| | | 6 days: OK | 6 days: 100% moderate cracking[1] | 2 |
| | 97.5/2.5 | 68 days: OK | 68 days: OK | 2 |
| | 95/5 | 68 days: OK | 68 days: OK | 2 |
| | 90/10 | 68 days: OK | 68 days: OK | 2 |
| Durem 117/ Maltrin M050 | 100/0 | 22 days: OK | 22 days: 100% moderate cracking | 2 |
| | | 10 days: OK | 10 days: 100% trace cracking | 2 |
| | | 6 days: OK | 6 days: 100% moderate cracking | 2 |
| | 97.5/2.5 | 42 days: OK | 42 days: OK | 1.5 |
| | 95/5 | 42 days: OK | 42 days: 10% slight | 1.5 |
| | 90/10 | 42 days: OK | 42 days: OK | 1.5 |
| Durem 117[3]/ Dri-Flo | 100/0 | 22 days: OK | 22 days: 100% moderate cracking | 2 |
| | | 10 days: OK | 10 days: 100% trace cracking | 2 |
| | | 6 days: OK | 6 days: 100% moderate cracking | 2 |
| | 97.5/2.5 | 13 days: 60% sever[1] 20% moderate 10% trace | | 1.5 |
| | 90/5 | 25 days: OK | 25 days: OK | 1.5 |
| | 9/10 | 25 days: OK | 25 days: OK | 1.5 |
| (Duratex[4]/ Durem 117)// N-Zorbit | (20/80)// 0 | 12 days: OK | 12 days: 100% moderate[1] | 1.0 |
| | (20/80)// 2.5 | 37 days: OK | 67 days: 20% trace | 1.5 |
| | (20/80)// 5 | 67 days: OK | 67 days: OK | 2 |
| | (20/80)// | 67 days: OK | 67 days: OK | 2 |

[1]Test was terminated because the product was undesirable
[2]A Dextrin product of Grain Processing Corp.
[3]A modified corn starch product of National Starch and Chemical Corp.
[4]A food grade powdered lubricant made from hydrogenated cotton seed oil

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
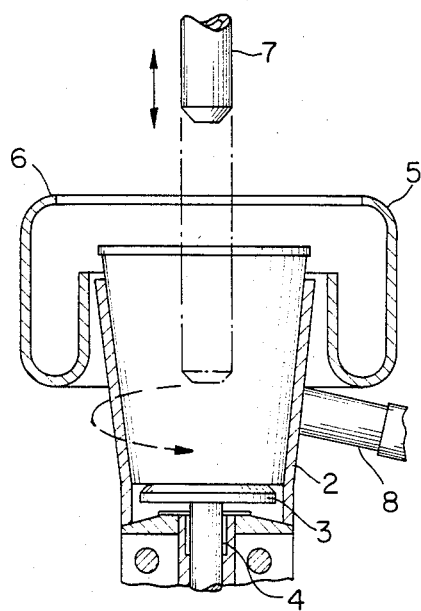
FIG. 1 is a device used for flo-coating an edible food container with a barrier coating composition.
Figure 2:
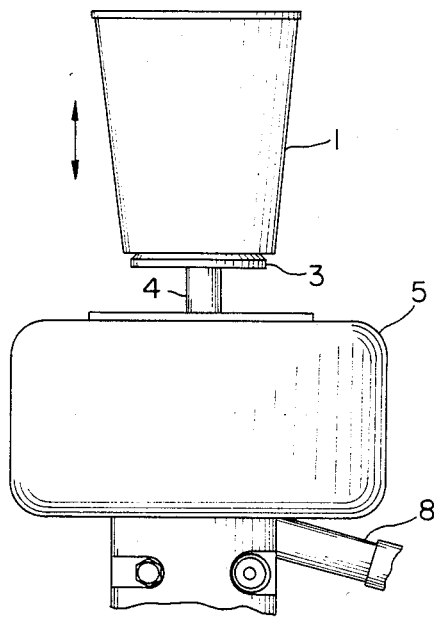
FIG. 2 is the device of FIG. 1 in a different position of operation.
Figure 3:
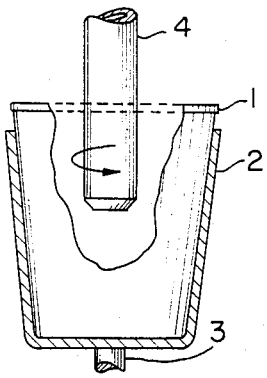
FIG. 3 is an alternative device for achieving the flo-coat method of the present invention.

An apparatus which can be effectively utilized in conducting the flo-coat method of coating edible food containers with the coating composition of the present invention is shown in FIGS. 1, 2 and 3 of the present application. FIG. 1 shows a food container 1, which in this case is a cone, disposed in a rotatable receptacle 2. The cone is supported by a platform 3 and a vertical post member 4. The platform 3 and the vertical post member 4 are adapted to move in the vertical direction independent of the rotation of the receptacle 2. The upper portion of the receptacle is provided with an overflow reservoir 5 which is adapted to retain excess coating material which is discharged from the food container during the coating operation. The reservoir is provided with an aperture 6 which permits the introduction of a nozzle 7 into the cup for loading the cup with the barrier coating material prior to the flo-coat operation. The reservoir 5 is also provided with a conduit means 8 for recyling the overflow coating material to the nozzle means 7 for reuse.

In operation, and specifically referring to FIG. 1, the food container 1 to be coated is introduced into the receptacle 2. Then the coating material is introduced into the food container through nozzle 7 up to a predetermined level. The receptacle containing the cup is then rotated at a high speed forcing the coating liquid up the inside of the container, and uniformly coating the entire inside surface of the cone. Any excess coating liquid escaping from the top of the cone runs into the reservoir 5 where it is collected and eventually recycled through a conduit 8 back to the feed nozzle 7. After the cone 1 has been uniformly coated on the inside thereof, it is removed from the receptacle tube through the aperture 6 provided in the reservoir 5 by the vertical movement of the platform 3 and the center post member 4 as shown in FIG. 2.

In an alternative embodiment of the apparatus of the present invention, the coating liquid can be forced up the inside of the container by the rotation of a mandril centrally disposed within the food container. Thus, in this embodiment, rather than rotating the receptacle which holds the food container, the coating material can be introduced into the food container and then the mandril can be rotated, thereby achieving the same result. In this latter embodiment, the nozzle which is used to introduce the flo-coating material into the food container can also function as the rotating mandril to achieve the desired internal coating effect.

In the flo-coating of the KC3 shells or other edible food containers, the coating operation is advantageously carried out at room temperature utilizing a modified fat which is heated to a temperature above its melting point. Thus the temperature to which the fat is heated depends upon the particular modified fat which is utilized as the coating material. The coated containers are generally permitted to slowly cool at ambient temperature, but if a more accelerated solidification and cooling of the fat coating is desired, the coated food containers can be placed in a cooling chamber.

The invention being thus described, it will be obvious that the same may be varied in many ways. Such variations are not to be regarded as a departure from the spirit and scope of the invention, and all such modifications as would be obvious to one skilled in the art are intended to included within the scope of the following claims.

What is claimed is:

1. A method of processing an edible food container for use a food product which comprises applying a moisture-resistant, barrier coating composition of a food grade modified fat material containing a filler material or a food grade fat containing a filler material, to at least the interior surface of the edible food container in an amount sufficient to produce a continuous, uniform film of said barrier coating composition on said surface, said barrier coating composition being applied by a flo-coating technique wherein an effective amount of said composition is introduced into the edible food container and the coating composition is then forced up the inside surface of the container, by imparting relative rotation to the container and coating composition to effect a rotational motion of the coating composition within the container.

2. The method of claim 1 wherein the edible food container is rotated to force the barrier coating composition up the inside surface of the container.

3. The method of claim 1 wherein the barrier coating composition within the container is rotated to force the coating composition up the inside surface of the container.

4. The method of claim 2 or 3 wherein the excess coating composition escapes from the top of the container and is recovered and recycled for reuse.

5. The method of claim 1 wherein the barrier coating composition is heated to slightly above the melting point of the fat material of modified fat material and the application of the barrier coating composition to the container is conducted at ambient temperature.

6. The method of claim 5 wherein the coated containers are cooled subsequent to the coating operation.

7. The method of claim 1 wherein the food grade modified fat is a mixture of monoglycerides and diglycerides.

8. The method of claim 1 wherein the filler material is selected from the group consisting of starches, chemically modified starches, dextrins, food grade talc, titanium dioxide, silica, and calcium phosphates.

9. The method of claim 8 wherein the starches and modified starches are selected from the group consisting of amylose starches, amylo-pectin starches, and acid and enzyme modified starches wherein a part of the starch is modified to dextrins, dextrose and other sugars.

10. The method of claim 9 wherein the starches and modified starches are selected from the group consisting of corn starch, waxy cornstarch, modified cornstarch and other food starches.

11. The method of claim 8 wherein the dextrin is selected from the group consisting of tapioca dextrin, corn dextrin, potato dextrin and wheat dextrin.

12. The method of claim 1 wherein the fats are natural or hydrosenated food grade fats which are solid at room temperature and provide an effective barrier to moisture penetration and wetting.

13. The method of claim 12 wherein the fats are solid glyceryl esters of higher fatty acids having 8 to 20 carbon atoms.

14. The method of claim 1 wherein the filler material is present in an amount of about 1 to 10% by weight, based on the total weight of the coating composition.

15. The method of claim 1 wherein the coating composition further contains a flavor producing material.

16. The method of claim 12 wherein the flavor producing material is rye, onion, garlic, orange, lemon, grapefruit, grape, banana or maple.

* * * * *